(No Model.)  2 Sheets—Sheet 1.

M. G. BAILEY.
TRUCK.

No. 516,857. Patented Mar. 20, 1894.

Inventor
Mahlon G. Bailey

Witnesses
Chas. W. Parker
Joseph P. Burg by Smith & Low
Attys

THE NATIONAL LITHOGRAPHING COMPANY,
WASHINGTON, D. C.

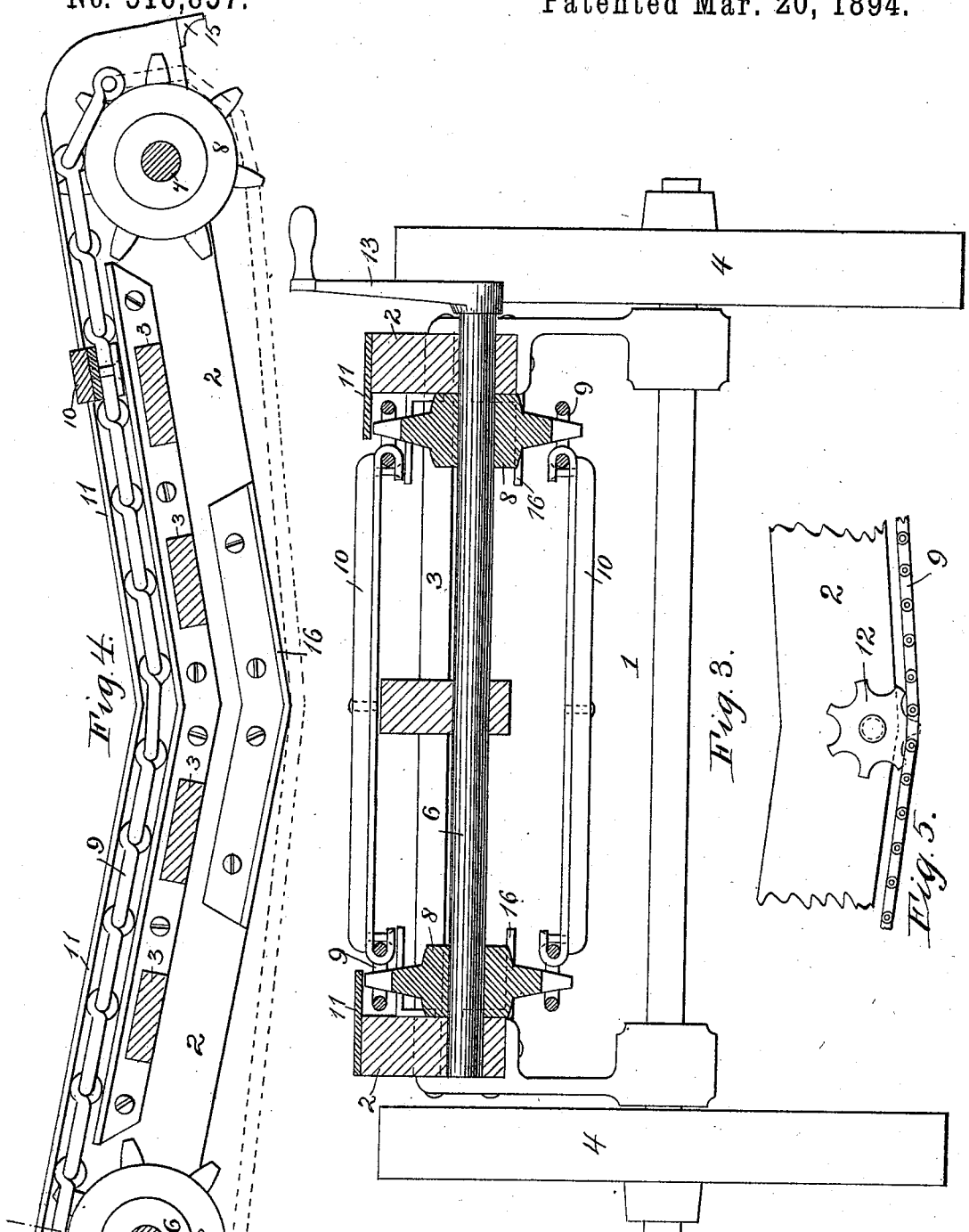

UNITED STATES PATENT OFFICE.

MAHLON G. BAILEY, OF SAN JOSÉ, CALIFORNIA, ASSIGNOR OF ONE-HALF TO CHARLES S. LAWRENCE, OF SAME PLACE.

TRUCK.

SPECIFICATION forming part of Letters Patent No. 516,857, dated March 20, 1894.

Application filed June 23, 1893. Serial No. 478,617. (No model.)

*To all whom it may concern:*

Be it known that I, MAHLON G. BAILEY, a citizen of the United States, residing at San José, in the county of Santa Clara and State of California, have invented certain new and useful Improvements in Trucks; and I do declare the following to be a full, clear, and exact description of the invention, such as will enable others skilled in the art to which it appertains to make and use the same.

My present invention relates to that class of trucks or carriers which is employed for handling baggage at railway stations, or for transporting boxes, bales and other packages or material in ware-houses.

The invention consists essentially of a baggage truck comprising a frame of suitable character and supporting wheels, and an endless carrier mounted thereon whose carrying surfaces constitute the bottom or a portion of the bottom of the said truck, and mechanical appliances for actuating said carrier so as to transport a package or piece of baggage from one part of the truck to another and to deliver it over the end of the truck into a baggage car or other desired place of deposit.

My improvement further consists in the parts and combinations thereof hereinafter more particularly set forth and claimed.

In order to make my improvement more clearly understood I have shown in the accompanying drawings means for carrying the same into practical effect, without however limiting the invention, in its useful application, to the particular construction which, for the sake of illustration, I have delineated.

Figure 1:
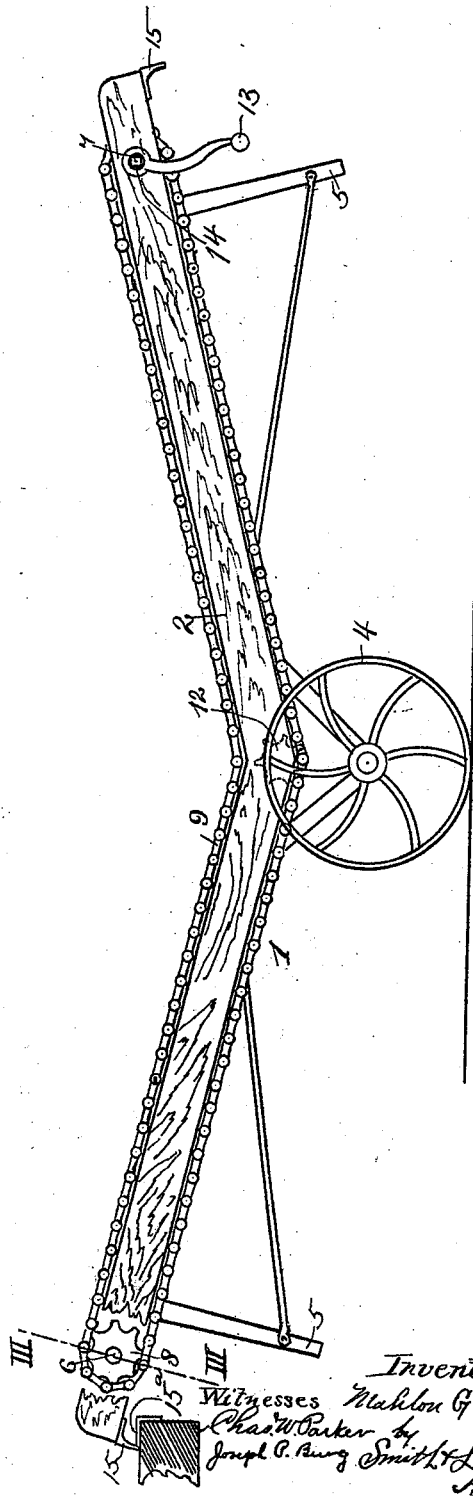
Figure 2:
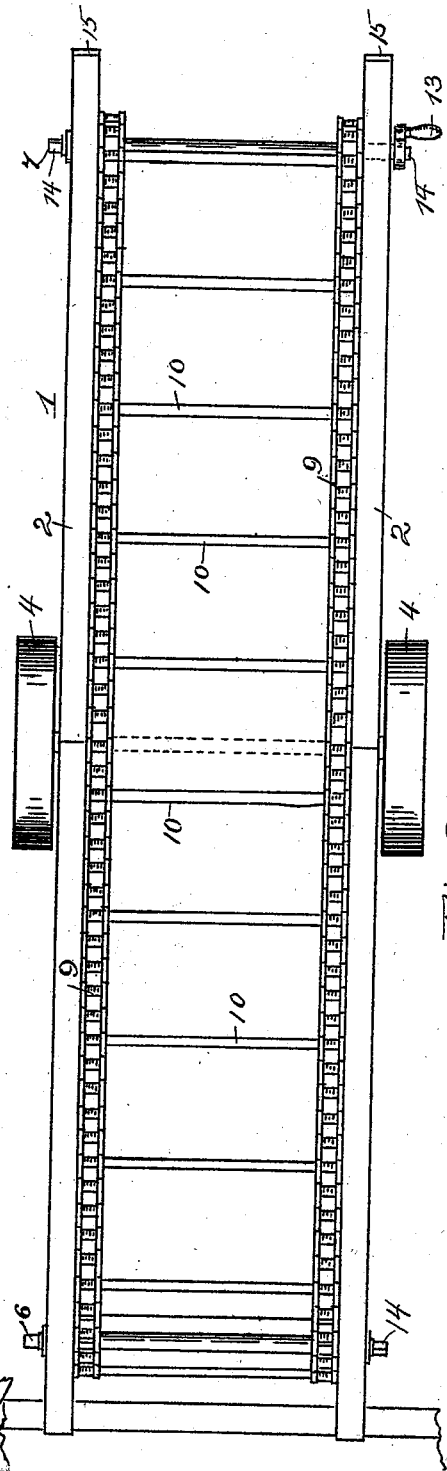

In the said drawings—Figure 1 is a side view of a truck provided with an endless carrier, the whole embodying my invention. Fig. 2 is a plan view of the same. Fig. 3 is a transverse sectional view on line III—III, of Fig. 1. Fig. 4 is a longitudinal sectional view of the body portion of the truck showing a different form of guiding means for the carrier chain, said means consisting of a rigid flange in place of a wheel or pulley. Fig. 5 is a detail view showing one of the guiding pulleys for the chains.

Referring to the drawings, 1 indicates a truck frame of any suitable or preferred character comprising preferably side bars 2 inclined with relation to each other as shown, in the usual manner to facilitate the piling up and delivery of baggage, and connected by cross pieces 3. The said frame is mounted at its middle upon transporting wheels 4, and is provided at or near each end with supporting legs 5. At or near each end of the said frame are journaled transverse shafts 6 and 7 and on which are mounted four or more sprocket or chain wheels 8.

9, 9 indicate two endless chains one running over each pair of the said sprocket wheels 8 and extending from end to end of the truck near the side frame pieces 2, and preferably just inside of the latter as best seen in Fig. 2.

10 indicates traveling cross pieces connected with the said chains 9 and extending from one of the said chains to the other across the truck from side to side. The tops of the cross pieces 10 stand up at sufficient height to receive and support a trunk or other box or package which may be placed upon the truck. The latter is preferably provided with longitudinal covering irons 11 which are bolted to the side frame pieces 1 and serve to cover the chains 9, the tops of the cross pieces 10 standing up between said irons to a height slightly greater than the top surfaces of the latter. These irons serve to hold the chains down at or near the middle of the truck and compel them to travel in directions parallel with the cross pieces 1. At or near the middle of the truck I prefer to mount two sprocket wheels or guide pulleys 12 which serve to hold down the bottom portion of each chain belt. The said chains may however be guided by rigid flanges 16, as shown in Figs. 3 and 4.

The end or ends of one or both of the shafts 6 and 7 is provided with a suitable crank or hand wheel whereby it may be actuated in the desired direction to deliver the baggage upon the truck 2 and over the proper end thereof, or the ends of said shafts are made square and a single removable crank 13 may be provided, which latter construction is the one illustrated. The squared ends of the shafts are indicated at 14.

As baggage is delivered over one or the other end of the truck and touches the floor of the car or other platform its movement tends to force the truck backward and away from the car or other object to which the baggage is being delivered. In order to prevent this result I provide one or both ends of the truck with a downwardly projecting spur 15 which will be adapted to engage with the floor of a baggage car, over the sill 15$^a$ thereof as best seen at the left hand end of Fig. 1, with the result of holding the truck firmly in place while the baggage is delivered. The baggage passing up the end of the truck which is thus engaged with the baggage car will serve to hold said end down with the spur in close engagement with the car or platform.

Having thus described my invention, what I claim, and desire to secure by Letters Patent of the United States, is—

1. In a baggage truck the combination with the frame thereof of two or more endless chain belts, means for actuating the same, and transverse slats or supporting pieces extending from one chain to the other across the truck and adapted to receive and transport baggage, substantially as set forth.

2. In a baggage truck consisting of two inclined frame portions 1, 1 the combination of an endless carrier extending from end to end of the said truck, means for actuating the same, and holding or guiding devices for preventing the said carrier from lifting up at or near the middle of the truck, substantially as set forth.

3. In a baggage truck the combination with the frame, of the transverse shafts 6, 7 mounted in the ends thereof, the chain belts 9 extending from end to end of the truck one at each side thereof, the sprocket wheels 8 on said shafts and supporting and adapted to actuate said chains, and supporting and carrying pieces mounted upon and connecting said chains, substantially as set forth.

4. The combination with a baggage truck, and an endless carrier thereon, of means for actuating said carrier, and means for connecting one end of said truck temporarily with the car or platform to which the baggage is to be delivered, substantially as set forth.

5. In a baggage truck the combination with the side pieces each of which is composed of two portions inclined relative to each other, of the endless carrier supported and actuated between the parts of said frame, the covering irons for directing the movement of the upper portions of said carriers, and the guiding wheels or pulleys 12 for keeping in place the lower portions of said carriers, substantially as set forth.

In testimony whereof I affix my signature in the presence of two witnesses.

MAHLON G. BAILEY.

Witnesses:
D. D. TENNYSON,
A. V. STOCKWELL.